(12) United States Patent
Karnalkar et al.

(10) Patent No.: US 9,635,184 B2
(45) Date of Patent: *Apr. 25, 2017

(54) APPARATUS AND METHOD FOR PROVIDING MESSAGING SERVICES

(71) Applicant: AT&T INTELLECTUAL PROPERTY I, LP, Atlanta, GA (US)

(72) Inventors: Anup D. Karnalkar, Allen, TX (US); R. Tyler Wallis, Greenwood Village, CO (US); William S. Robbins, Sun Prairie, WI (US); David Dudley, Meadow Vista, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/139,692

(22) Filed: Apr. 27, 2016

(65) Prior Publication Data

US 2016/0248913 A1 Aug. 25, 2016

Related U.S. Application Data

(63) Continuation of application No. 14/832,488, filed on Aug. 21, 2015, now Pat. No. 9,357,360, which is a (Continued)

(51) Int. Cl.
*H04M 1/64* (2006.01)
*H04M 3/533* (2006.01)
(Continued)

(52) U.S. Cl.
CPC ........ *H04M 3/533* (2013.01); *H04L 65/1006* (2013.01); *H04M 1/57* (2013.01); *H04M 1/7255* (2013.01); *H04M 3/2218* (2013.01); *H04M 3/42059* (2013.01); *H04M 3/53333* (2013.01); *H04W 4/12* (2013.01);
(Continued)

(58) Field of Classification Search
CPC ...................................................... H04M 1/64
USPC ..... 379/67.1, 68, 88.09, 88.12, 88.11, 88.22, 379/88.23, 88.25
See application file for complete search history.

(56) References Cited

U.S. PATENT DOCUMENTS 5,657,376 A 8/1997 Espeut et al.
6,014,559 A 1/2000 Amin
(Continued)

*Primary Examiner* — Olisa Anwah
(74) *Attorney, Agent, or Firm* — Chiesa Shahinian & Giantomasi PC

(57) ABSTRACT

A system that incorporates teachings of the present disclosure may include, for example, a voicemail device having a controller to detect a recording of a voicemail message, generate a Session Initiation Protocol (SIP) message, wherein the SIP message contains visual voicemail data associated with the recorded voicemail message, and transmit the SIP message to a cordless phone system, wherein the SIP message is received by the cordless phone system over a data port of the cordless phone system, wherein the cordless phone system comprises a base station and at least one cordless communications device, wherein the visual voicemail data is retrieved by the base station, and wherein the visual voicemail data is transmitted by the based station to the at least one cordless communications device by utilizing a cordless wireless access protocol. Other embodiments are disclosed.

20 Claims, 7 Drawing Sheets

Related U.S. Application Data continuation of application No. 13/836,248, filed on Mar. 15, 2013, now Pat. No. 9,143,905, which is a continuation of application No. 12/559,848, filed on Sep. 15, 2009, now Pat. No. 8,433,044.

(51) Int. Cl.
*H04M 3/22* (2006.01)
*H04M 3/42* (2006.01)
*H04W 4/12* (2009.01)
*H04L 29/06* (2006.01)
*H04M 1/57* (2006.01)
*H04M 1/725* (2006.01)
*H04M 7/00* (2006.01)

(52) U.S. Cl.
CPC ......... *H04L 65/1016* (2013.01); *H04M 7/006* (2013.01); *H04M 2203/253* (2013.01); *H04M 2250/08* (2013.01)

(56) References Cited

U.S. PATENT DOCUMENTS

| | | | |
|---|---|---|---|
| 6,085,231 A | 7/2000 | Agraharam et al. | |
| 6,091,947 A | 7/2000 | Sumner | |
| 6,341,160 B2 | 1/2002 | Tverskoy et al. | |
| 7,203,733 B1 | 4/2007 | Bern | |
| 7,379,421 B1 | 5/2008 | Gao et al. | |
| 7,492,872 B1 | 2/2009 | Di Carlo et al. | |
| 7,684,549 B2 | 3/2010 | Ying et al. | |
| 7,903,794 B1 | 3/2011 | Bales et al. | |
| 8,064,367 B2 | 11/2011 | Sin et al. | |
| 8,285,833 B2 * | 10/2012 | Blair | H04L 29/06027 379/265.07 |
| 8,443,403 B2 | 5/2013 | Bell et al. | |
| 2002/0085686 A1 | 7/2002 | Cullis | |
| 2002/0131566 A1 | 9/2002 | Stark et al. | |
| 2003/0112938 A1 | 6/2003 | Kanakubo et al. | |
| 2004/0121761 A1 * | 6/2004 | Tripathy | H04M 1/7255 455/413 |
| 2006/0133582 A1 | 6/2006 | McCulloch | |
| 2006/0246878 A1 | 11/2006 | Khoury | |
| 2006/0291471 A1 | 12/2006 | Heuer et al. | |
| 2007/0010233 A1 | 1/2007 | Wang et al. | |
| 2008/0069316 A1 * | 3/2008 | Walter | H04M 3/42238 379/88.18 |
| 2008/0192902 A1 | 8/2008 | Adamczyk et al. | |
| 2008/0281971 A1 | 11/2008 | Leppanen et al. | |
| 2009/0061828 A1 | 3/2009 | Sigmund et al. | |
| 2009/0061850 A1 * | 3/2009 | Li | H04M 1/72502 455/426.1 |
| 2009/0066781 A1 | 3/2009 | Jackson et al. | |
| 2009/0070469 A1 | 3/2009 | Roach et al. | |
| 2009/0180597 A1 | 7/2009 | Jackson et al. | |
| 2009/0258633 A1 | 10/2009 | Kim et al. | |
| 2010/0056111 A1 | 3/2010 | Boyaci et al. | |
| 2010/0128853 A1 | 5/2010 | Karnalkar et al. | |
| 2010/0151834 A1 | 6/2010 | Kalbag | |
| 2010/0159888 A1 | 6/2010 | Sigmund et al. | |
| 2010/0195541 A1 | 8/2010 | Ray | |
| 2011/0143716 A1 | 6/2011 | Shaw | |

\* cited by examiner

APPARATUS AND METHOD FOR PROVIDING MESSAGING SERVICES

CROSS REFERENCE TO RELATED APPLICATIONS

This application is a continuation of prior U.S. patent application Ser. No. 14/832,488, filed Aug. 21, 2015, which is a continuation of U.S. patent application Ser. No. 13/836,248 filed Mar. 15, 2013, now U.S. Pat. No. 9,143,905, which is a continuation of U.S. patent application Ser. No. 12/559,848 filed Sep. 15, 2009, now U.S. Pat. No. 8,433,044, the disclosures of which are herein incorporated by reference in their entirety.

FIELD OF THE DISCLOSURE

The present disclosure relates generally to messaging services and more specifically to an apparatus and method for providing messaging services.

BACKGROUND

Often times users utilize voicemail and other messaging services to convey messages to other users, particularly when the other users are unavailable. Various technologies such as answering machines, traditional dial-in voicemail, and visual voicemail can be utilized by users to access voicemail messages and information associated with the voicemail messages. Answering machines and traditional dial-in voicemail are generally not user-friendly and require users to access voicemail messages in the order in which they were recorded. On the other hand, visual voicemail provides users with a greater level of information about their voicemail by adding a visual aspect to voicemail. Additionally, visual voicemail provides users with more functionality and ways of interacting with the voicemail. For example, visual voicemail can allow users to access messages out of order, pause messages during playback, access information pertaining to the voicemail, or even read transcripts of the voicemail as text.

DETAILED DESCRIPTION

One embodiment of the present disclosure can entail a voicemail device having a controller to detect a recording of a voicemail message, generate a Session Initiation Protocol (SIP) message, wherein the SIP message contains visual voicemail data associated with the recorded voicemail message, and transmit the SIP message to a cordless phone system, wherein the SIP message is received by the cordless phone system over a data port of the cordless phone system, wherein the cordless phone system comprises a base station and at least one cordless communications device, wherein the visual voicemail data is retrieved by the base station, and wherein the visual voicemail data is transmitted by the base station to the at least one cordless communications device by utilizing a cordless wireless access protocol. Other embodiments are disclosed.

Another embodiment of the present disclosure can entail a cordless phone system including one or more cordless communications devices, and a base station communicatively coupled to the one or more cordless communications devices using a cordless wireless access protocol, wherein the base station is operable to receive a SIP message wherein the SIP message comprises visual voicemail data associated with a recorded voicemail message, retrieve the visual voicemail data from the SIP message, and transmit the visual voicemail data to the at least one cordless communications device using the cordless wireless access protocol.

Yet another embodiment of the present disclosure can entail a computer-readable storage medium, comprising computer instructions to receive a request for an identifier associated with a voicemail message from a phone system, wherein the phone system comprises a base station and at least one cordless communications device, transmit the identifier associated with the voicemail message to the phone system, wherein the identifier is extracted by the base station, receive a request from the base station for the voicemail message, wherein the message is requested via the identifier, and transmit the voicemail message to the cordless phone system, wherein the voicemail message is transcoded during transmission of the voicemail message.

Figure 1:
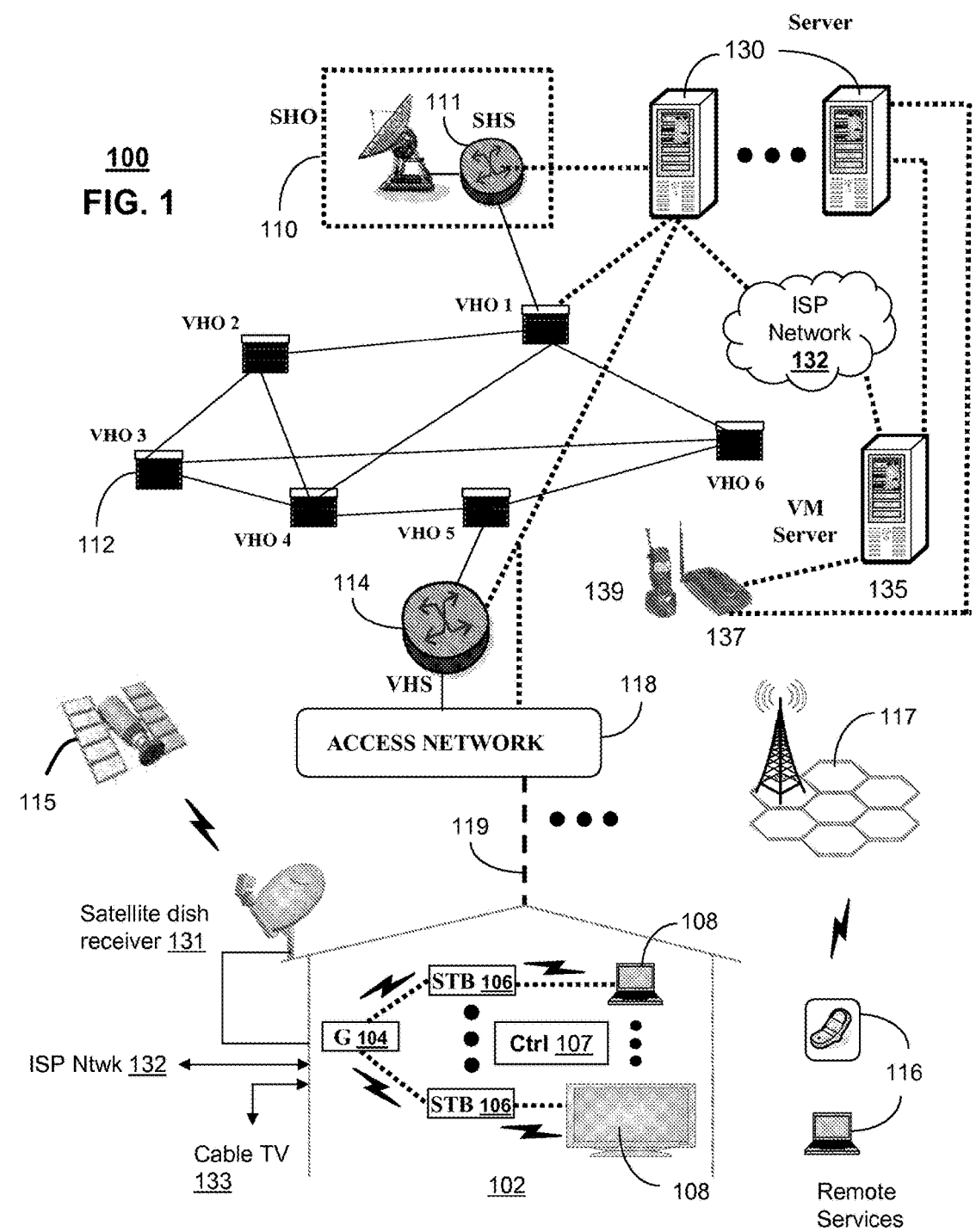
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

The first communication system 100 can also include a voicemail server 135. The voicemail server 135 can be communicatively coupled to the ISP network 132 and to communications devices such as wireless communication device 116 via wireless access base station 117. Additionally, the voicemail server can be communicatively coupled to base station 137 and communications device 139 via base station 137. The communications device 139 can be a cordless telephone or other similar communications device. Notably, the voicemail server 135 can be configured to detect, manage, and process voicemail messages, voicemail data associated with the voicemail messages, and/or other types of content and data. The voicemail server 135 can also be configured to transmit notification messages to the base station 137 based upon a triggering event. For example, if a new voicemail message is detected by the voicemail server 135, the voicemail server 135 can transmit a notification indicating the arrival of the message to the base station 137.

Another distinct portion of the computing devices 130 can function as a server (herein referred to as server 130). The server 130 can use common computing and communication technology to perform the function of distributing data content, messaging content, and/or other types of content to various devices in the system 100. Notably, the server 130 can be configured to communicatively link to the VM server 135, base station 137, and to gateway 104 via the access network 118. The server 130 can also be configured to relay messages and data transmitted from the voicemail server 135 to the base station 137 and/or to other authorized devices in the system 100 and messages and data transmitted from the base station 137 to the voicemail server 135.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
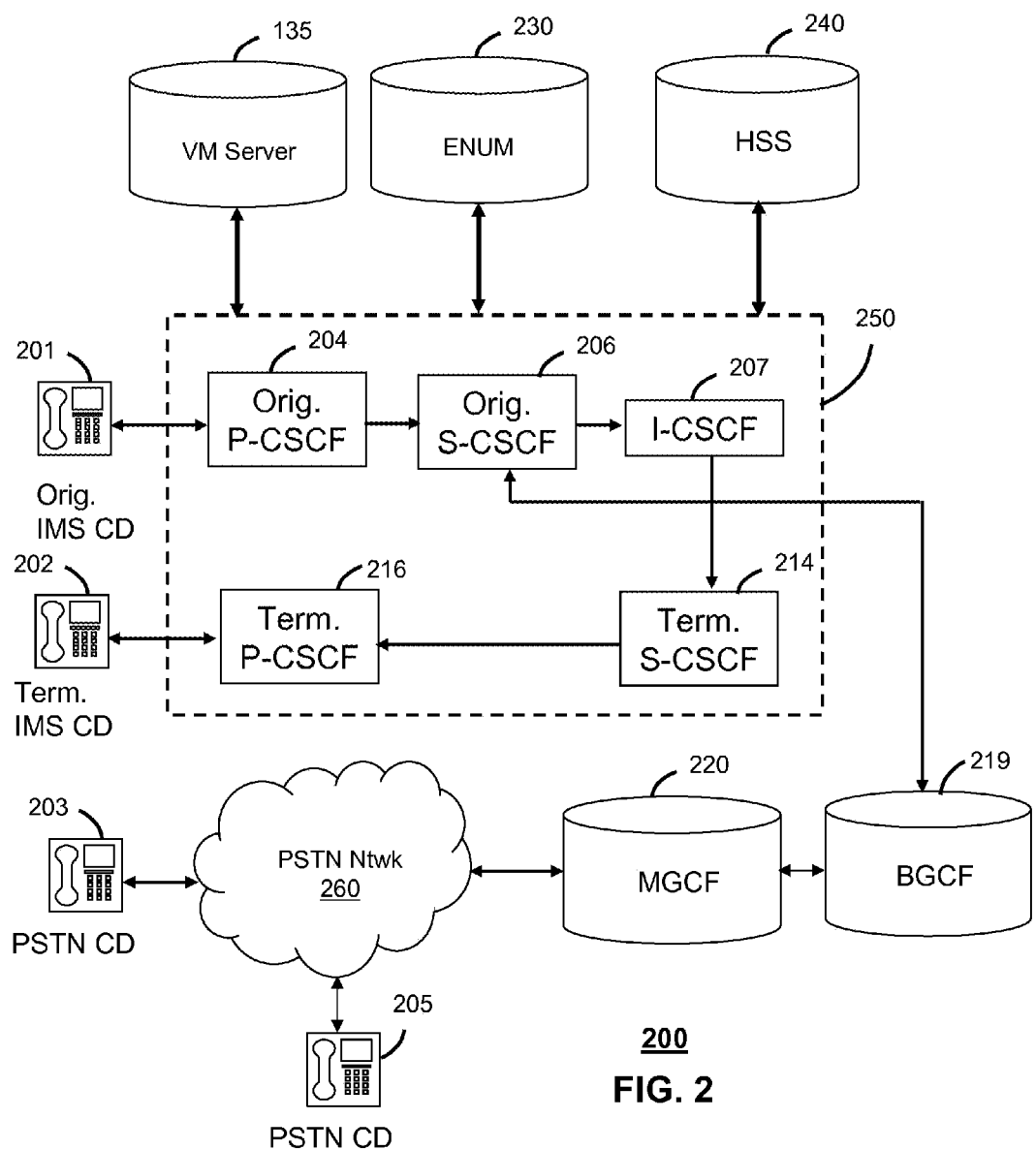

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a SIP INVITE message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The server 130 and the VM server 135 of FIG. 1 can be operably coupled to the second communication system 200 for purposes similar to those described above.

Figure 3:
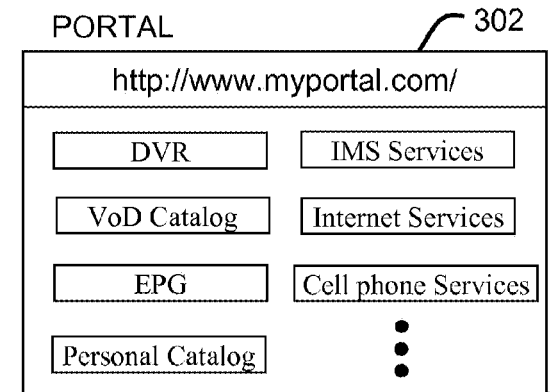
FIG. 3 depicts an illustrative embodiment of a portal interacting with the communication systems of FIGS. 1-2.
Figure 3:
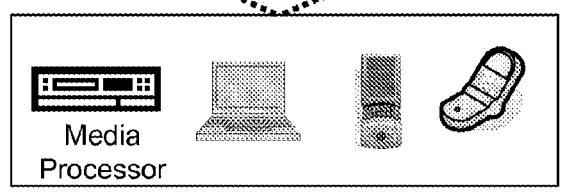

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
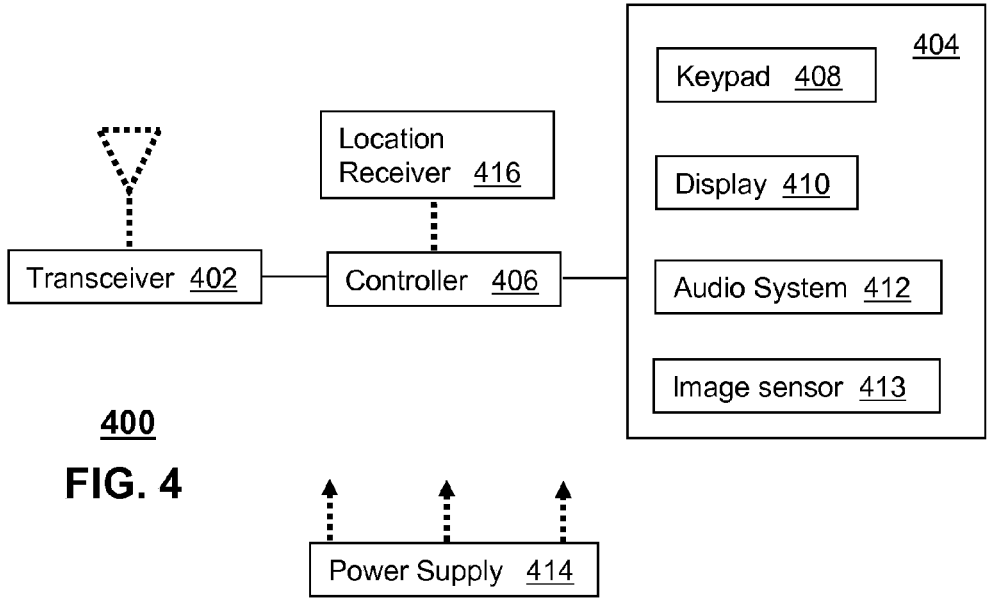
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
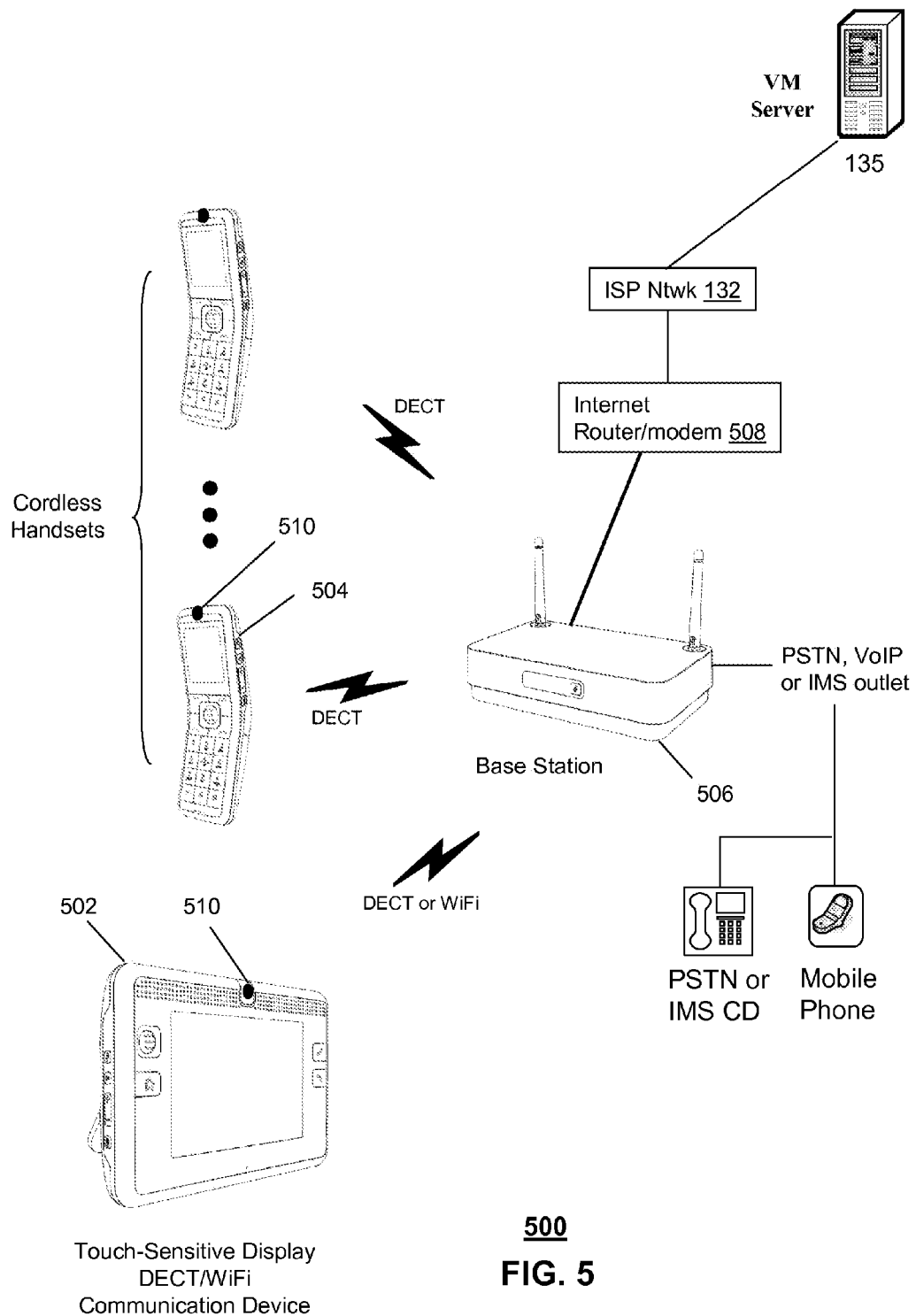
FIG. 5 depicts an illustrative embodiment of a system for providing messaging services, which can operate in portions of the communications systems of FIGS. 1-2.

FIG. 5 depicts an illustrative embodiment of a system 500 for providing messaging services, the system operable in portions of the communication systems of FIGS. 1-2. The system 500 can include a communications device 502, which can be configured to include a cellular phone and/or a landline phone. The communication device 502 may can be a frame, a tablet with a touch-sensitive display, or other similar device. The communication device 502 can be configured to support DECT, WiFi, and other protocols. Notably, the communication device 502 can be communicatively coupled to a base station, such as base station 506, by utilizing DECT and WiFi air interfaces. Additionally, one or more cordless handsets 504 can also be communicatively coupled to the base station 506 using the DECT or other similar protocols.

The base station 506 can include communication technology for communicatively interfacing to a PSTN, VoIP, or IMS network such as those described earlier, such as in communication system 100. Also, the base station 506 can be coupled to a data modem such as an Internet/router modem 508 for communicatively linking to the ISP network 132 and the VM server 135 of communication system 100. In an embodiment, the base station 506 and other devices in the system 500 and system 100 can be configured to communicate by utilizing web services. The base station 506 can provide the cordless handsets 504 with voice communications services, and the communication device 502 a combination of voice and data communication services. The communication device 502 and cordless handsets 504 can be equipped with common camera sensors 510 (such as CCD sensors) which can enable these devices to support video communication services and capture still images and/or pictures.

Operatively, the base station 506 can be configured to receive one or more SIP messages from the VM server 135 via the ISP network 132. The SIP message can include visual voicemail data, which can be associated with a recorded and/or detected voicemail message. The voicemail message can be an audible message or other message produced by a caller, which is intended for at least one of the communications device 502 and the cordless handsets 504. In an embodiment, the SIP message can be relayed by a SIP Proxy/Registrar from the VM server 135 to the base station 506. Once the SIP message is received by the base station 506, the base station 506 can extract the visual voicemail data from the SIP message. The extracted visual voicemail data can then be transmitted to communications device 502 and/or cordless handsets 504 by using a wireless protocol such as DECT, WiFi, and/or Personal Handy-phone System (PHS).

In an embodiment, the VM server 135 can be configured to receive a request for the voicemail message from the base station 506. Upon receiving the request, the VM server 135 can transmit the voicemail message to the base station 506, which can relay the voicemail message to the communications device 502 and/or the cordless handsets 504. During transmission of the voicemail to the base station 506 or prior to transmission of the voicemail to the base station 506, the VM server 135 and/or the server 130 can be configured to transcode the voicemail message from one format to a format that can be utilized by the base station 506, communications device 502, and/or the cordless handsets 504. For example, the VM server and/or the server 130 can be configured to transcode the voicemail message from a G.711 format to a G.726 format.

Figure 6:
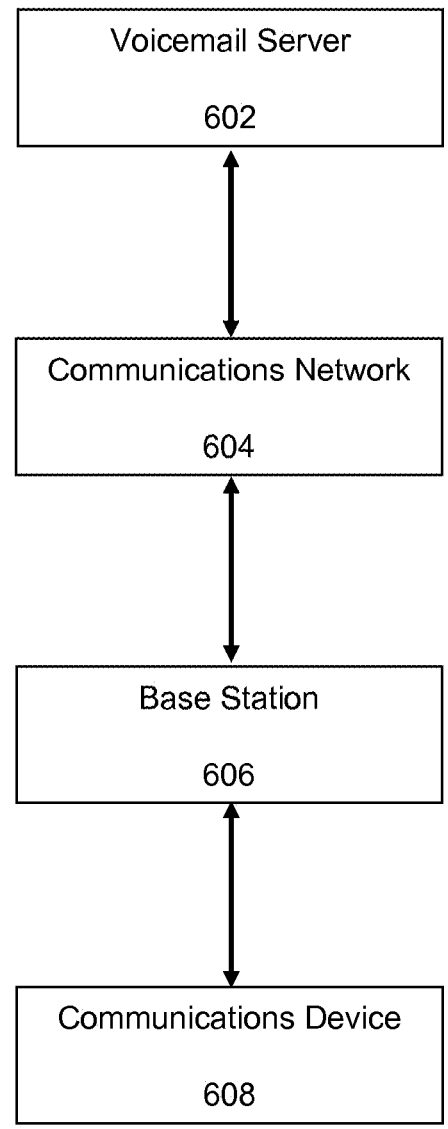
FIG. 6 depicts a flow diagram for providing messaging services in the communication systems of FIGS. 1-2 and FIG. 5.

Referring now also to FIG. 6, a flow diagram for providing messaging services in the communication systems of FIGS. 1-2 and FIG. 5 is illustratively shown. The flow diagram illustrates a voicemail server 602, which can correlate to VM server 135, which can relay SIP messages and voicemail messages through a communications network 604. The communications network 604 can be configured to transmit the SIP messages and/or the voicemail messages to the base station 606, such as base station 506, which can then forward the messages to a communications 608 device operably coupled to the base station 606. Similarly, the base station 606 can make requests on behalf of the communications device 608 and transmit the requests to the voicemail server 602 via the communications network 604.

Figure 7:
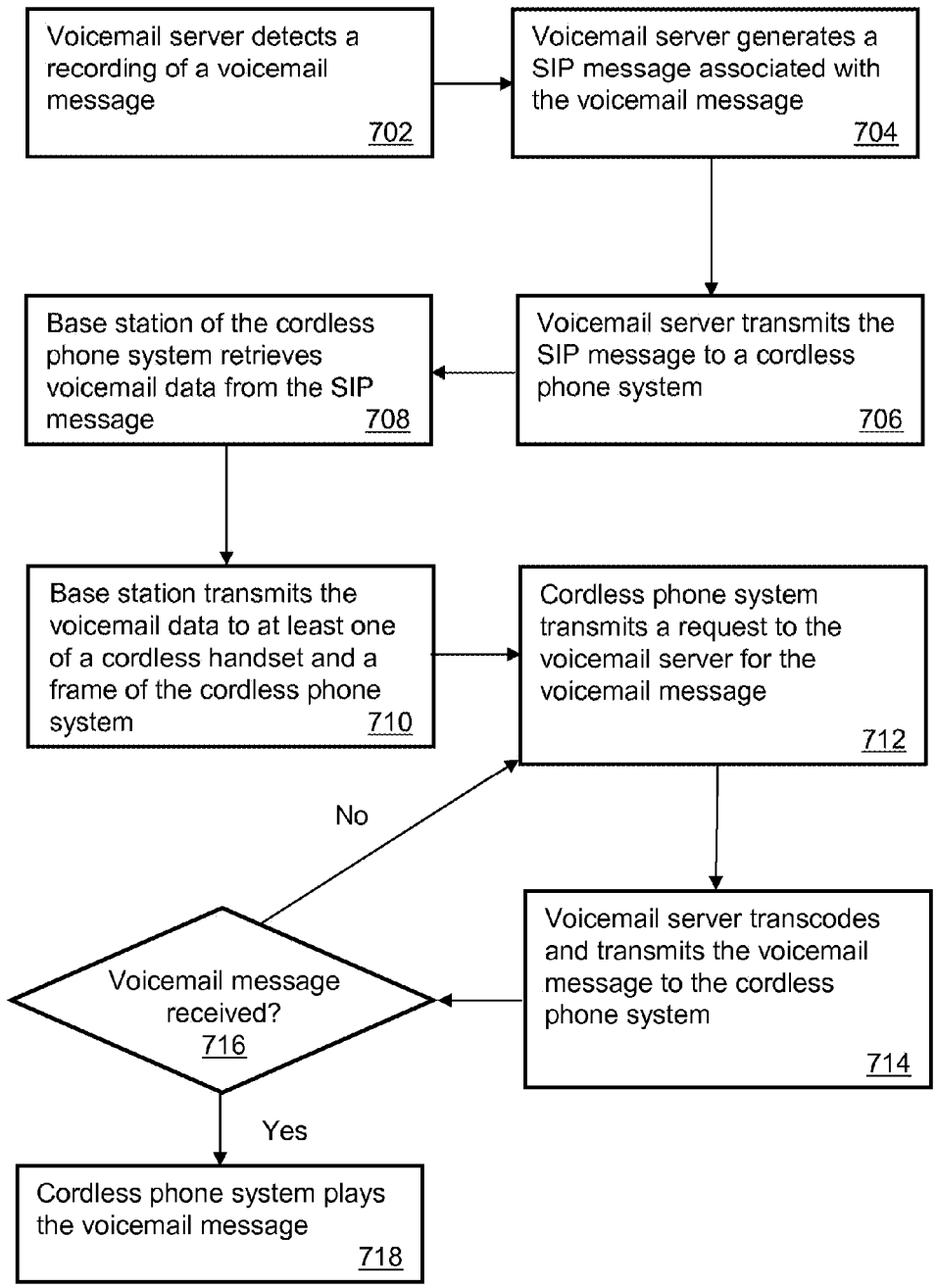
FIG. 7 depicts an illustrative embodiment of a method for providing messaging services operating in portions of the communications systems of FIGS. 1-2 and 5.

FIG. 7 depicts an illustrative method 700 for providing messaging services that operates in portions of the communication system of FIGS. 1-2 and FIG. 5. Method 700 can begin with step 702 in which a voicemail server, such as VM server 135, can detect a recording of a voicemail message. The voicemail message can include audio content, video content, a combination of audio and video content, and/or other types of content. The voicemail message itself can be generated by a caller for a recipient, particularly when the intended recipient of the voicemail message is unavailable for direct communication. Once the voicemail server has detected a recording of a voicemail message, the voicemail server can generate a SIP message at step 704.

The SIP message can include visual voicemail data associated with the recorded voicemail message. The visual voicemail data can include one or more of a caller identification number, a recording time of the voicemail message, an identity of a caller of the voicemail message, and a duration time for the voicemail message. For example, the visual voicemail data can include a phone number such as "321-411-1212," which was generated by "Bob Smith" at 6:42 P.M. The visual voicemail data can also indicate that the duration of Bob Smith's voicemail message, which in this case can be three minutes long. Of course the voicemail data associated with the recorded voicemail message can include other information associated with the voicemail message and is not limited to the above listing.

At step 706, the voicemail server can transmit the generated SIP message to a cordless phone system over a data port of the cordless phone system. The cordless phone system can include one or more cordless handsets, such as cordless handsets 504, a base station, such as base station 506, and one or more communications devices, such as communications device 502, which can be a touch-screen computing tablet or a frame. In an embodiment, the data port can be an Internet data port or other similar port. Once the SIP message is received by the cordless phone system, the base station can retrieve the visual voicemail data and/or other data associated with a voicemail message from the SIP message at step 708.

At step 710, the base station can transmit the retrieved voicemail data to at least one of a cordless handset and a tablet/frame included in the cordless phone system. Notably, the base station can transmit the retrieved voicemail data to the cordless handset using a cordless wireless access protocol such as DECT. The base station can transmit the voicemail data to the frame/table using DECT and/or WiFi. In an embodiment, the base station can utilize PHS to transmit the voicemail data to the cordless communications devices. A user of the cordless handset and/or the tablet/frame can then view the visual voicemail data such as through a software application or other means.

At step 712, the user of the cordless handset and/or the frame can cause the handset or the frame to transmit a request to the voicemail server for the voicemail message via the base station. The voicemail server upon receiving the request from the cordless phone system can transmit the voicemail message to the cordless phone system at step 714. Notably, during transmission of the voicemail message or prior to transmission of the voicemail message, the voicemail server can transcode the voicemail message from one format to a format that can be utilized by the cordless phone system. For example, the voicemail server can transcode from a G.711 format to a G.726 format and the transcoding can performed in real-time. In an embodiment, the voicemail server can either transmit the voicemail message as a stream or as a progressive download to the cordless phone system.

At step 716, the cordless phone system can determine whether or not the voicemail message was received. If not, the base station can retransmit a request for the voicemail message to the server. The server can repeat step 714 by transcoding and transmitting the voicemail message to cordless phone system. Once the voicemail message is received by the cordless phone system, the cordless handset and/or the frame can play the voicemail message for the user at step 718. The voicemail data can be displayed to the user during playback of the voicemail message as well. In one embodiment, the voicemail message can be stored at the cordless phone system for future use.

Upon reviewing the aforementioned embodiments, it would be evident to an artisan with ordinary skill in the art that said embodiments can be modified, reduced, or enhanced without departing from the scope and spirit of the claims described below. For example, in an embodiment, the SIP message can be triggered to be sent by the voicemail server each time a user logs out of their voicemail mailbox, their voicemail message count falls to zero, and/or when a new voicemail message arrives. Of course, other triggering events are contemplated as well and the invention is not to be limited to the examples provided above. For example, SIP messages can be sent according to a selected schedule such as every four hours. The SIP message can also provide status information pertaining to the user's voicemail box.

In an embodiment, the methods above and the operation of the systems above can be further modified. In particular, the retrieval of the voicemail message can be supplemented as follows. The base station of the cordless phone system can be configured to utilize a web service or other program to retrieve an identifier associated with a voicemail message from the voicemail server. For example, the identifier can be a Uniform Resource Identifier (URI) such as a URL. Upon receiving the request, the voicemail server can transmit the identifier associated with the voicemail message to the base station. The base station can then be utilized to request the voicemail message from the voicemail server by utilizing the identifier. The voicemail server can then proceed to transcode and transmit the voicemail message to the cordless phone system.

In one embodiment, the operative functions of the voicemail server 135 can be split up amongst one or more other servers. In another embodiment, the communications devices 502 and 504 can employ a 300 millisecond delay loop to reduce Internet jitter of the played voice message. Also, the voicemail server can be configured to transcode the voicemail messages with an average latency per message of less than 100 milliseconds. The messages can be played to the user of the communications devices 502 and 504 as it is received from the 300 millisecond delay loop/buffer to reduce skipping.

In another embodiment, the base station can be configured to update call logs stored on the base station by utilizing a web service or other program. For example, the base station can remove entries from the call log, add entries to the call log, and/or flag entries in the call log. In yet another embodiment, the cordless phone system can initiate a registration sequence, which can involve pressing a voicemail icon on the display of the communications devices 502 or 504, which can cause the devices to display a request for user input for a telephone number and a personal identification number (PIN). The user can input the telephone number and the PIN into the communications device and the communications device can add the telephone number and PIN to Simple Object Access Protocol (SOAP) headers utilized during communication between the cordless phone system and the voicemail server.

The voicemail server can analyze the telephone number and PIN and can validate the inputs. If the phone number and PIN are incorrect, the server can request the user to re-enter the PIN and phone number or allow the user to cancel the process. If the phone number and PIN are correct, the user can log into their voicemail box. In an embodiment, a visual voicemail state can be set to "inactive" or "active" status on the base station. In the active state, it can allow for two-way communication between the base stations to access the voicemail server. In another embodiment, the cordless phone system and/or the voicemail server can allow the user to update their telephone number and PIN combination.

In one embodiment, when a voicemail is unread by the user, the communications devices can display an icon in a missed call log indicating that there is an unread message. Additionally, the cordless phone system can provide other features regarding the user's voicemail box. For example, the cordless phone system can display a list of all voicemail messages of the user, allow the user to use a touch screen to open and listen to a voicemail message, and/or enable the user to interact with and/or edit the messages. The user can also be allowed to delete messages whether they are read or unread. In another embodiment, when a voicemail message is selected by the user from the server's inbox or the call log of the base station, a one-click visual control can be provided to access the visual voicemail data. Also, other visual media controls can be provided so that the user can interact with the voicemail messages.

Other suitable modifications can be applied to the present disclosure without departing from the scope of the claims below. Accordingly, the reader is directed to the claims section for a fuller understanding of the breadth and scope of the present disclosure.

Figure 8:
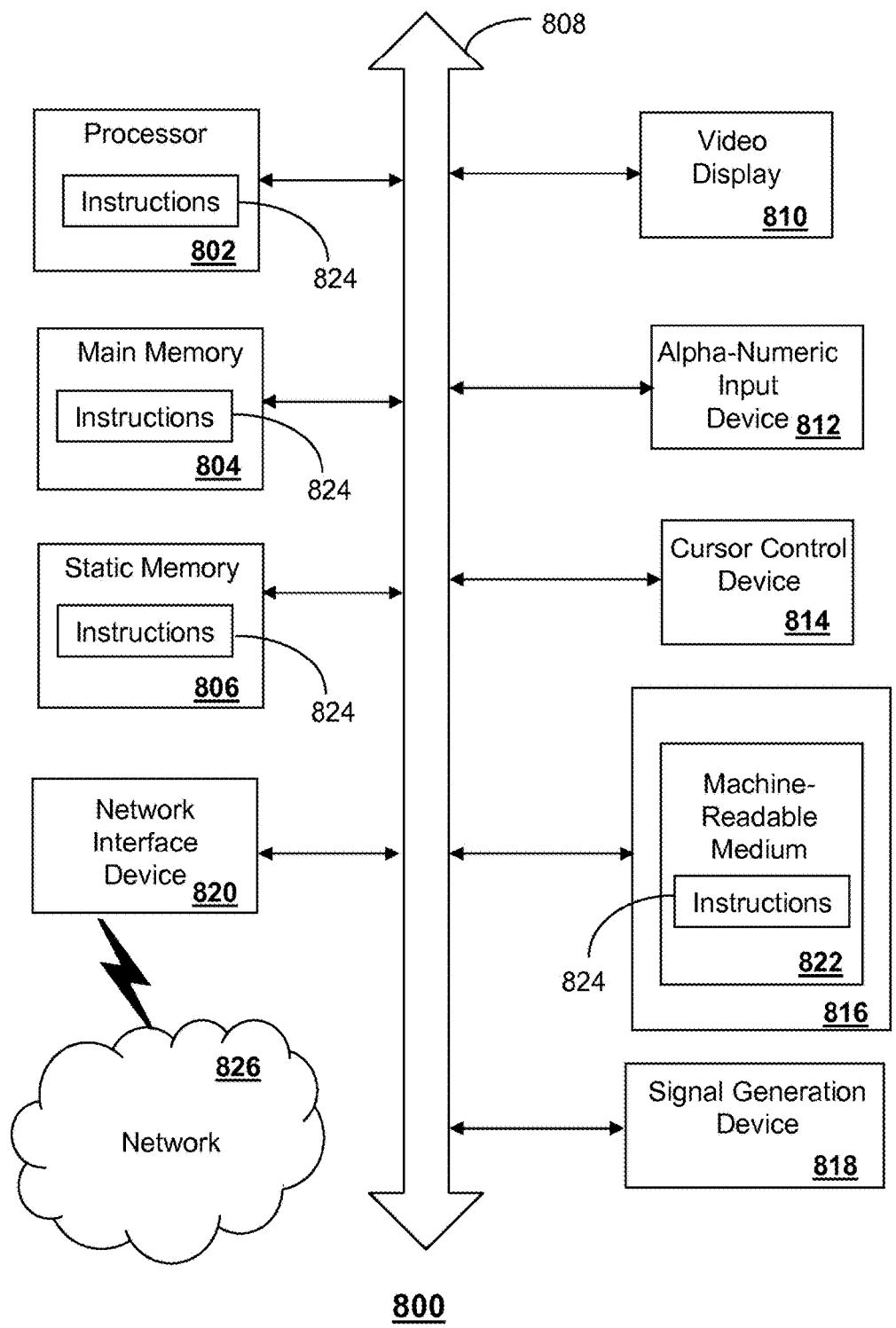
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a processor; and
   a memory that stores executable instructions that, when executed by the processor, facilitate performance of operations, comprising:
   transmitting a session initiation protocol message in response to a triggering event, the session initiation protocol message including status information associated with a voicemail message to a cordless phone system, wherein the cordless phone system retrieves the status information from the session initiation protocol message for presentation at a display;
   receiving a request for the voicemail message from the cordless phone system, the request comprising a uniform resource identifier associated with the voicemail message;
   transcoding the voicemail message to generate a transcoded voicemail message including a format compatible with the cordless phone system; and
   transmitting the transcoded voicemail message to the cordless phone system.

2. The device of claim 1, wherein the processor comprises a plurality of processors operating in a distributed processing environment, and wherein the operations further comprise generating the session initiation protocol message responsive to detecting a recording of the voicemail message.

3. The device of claim 1, wherein the triggering event is detecting recording of the voicemail message.

4. The device of claim 1, wherein the session initiation protocol message further includes visual voicemail data.

5. The device of claim 1, wherein the cordless phone system communicates using a digital enhanced cordless telecommunications protocol.

6. The device of claim 1, wherein the voicemail message includes an audible recording of a caller.

7. The device of claim 1, wherein the transcoded voicemail message is transmitted to the cordless phone system as a stream.

8. The device of claim 1, wherein the status information includes a caller identification number, a recording time of the voicemail message, an identity of a caller of the voicemail message, a duration time for the voicemail message, or any combination thereof.

9. The device of claim 1, wherein the voicemail message is transcoded from a G.711 format to a G.726 format.

10. A method, comprising:
generating, by a system comprising a processor, a session initiation protocol message including status information associated with a voicemail message;
transmitting, by the system, the session initiation protocol message to a cordless phone system in response to a triggering event;
receiving, by the system, a request for the voicemail message from the cordless phone system, the request comprising a uniform resource identifier associated with the voicemail message;
transcoding, by the system, the voicemail message to generate a transcoded voicemail message comprising a format compatible with the cordless phone system; and
transmitting, by the system, the transcoded voicemail message to the cordless phone system.

11. The method of claim 10, wherein the processor comprises a plurality of processors operating in a distributed processing environment, wherein the cordless phone system retrieves the status information from the session initiation protocol message for presentation at a display.

12. The method of claim 10, wherein the generating of the session initiation protocol message is responsive to detecting the triggering event, the triggering event comprising recording of the voicemail message.

13. The method of claim 10, wherein the session initiation protocol message further includes visual voicemail data.

14. The method of claim 10, wherein the cordless phone system communicates using a digital enhanced cordless telecommunications protocol.

15. The method of claim 10, wherein the transcoded voicemail message is transmitted to the cordless phone system as a stream.

16. The method of claim 10, wherein the status information includes a caller identification number, a recording time of the voicemail message, an identity of a caller of the voicemail message, a duration time for the voicemail message, or any combination thereof.

17. A non-transitory machine-readable storage medium, comprising executable instructions that, when executed by a processor, facilitate performance of operations, comprising:
detecting a triggering event;
transmitting a session initiation protocol message to a cordless phone system responsive to the detecting the triggering event, wherein the session initiation protocol message includes status information associated with a voicemail message;
receiving a request for the voicemail message from the cordless phone system, the request comprising a uniform resource identifier associated with the voicemail message;
transcoding the voicemail message to generate a transcoded voicemail message including a format compatible with the cordless phone system; and
transmitting the transcoded voicemail message to the cordless phone system.

18. The non-transitory machine-readable storage medium of claim 17, wherein the processor comprises a plurality of processors operating in a distributed processing environment.

19. The non-transitory machine-readable storage medium of claim 17, wherein the operations further comprise generating the session initiation protocol message responsive to the detecting the triggering event, wherein the triggering event comprises detecting recording of the voicemail message.

20. The non-transitory machine-readable storage medium of claim 17, wherein the cordless phone system communicates using a digital enhanced cordless telecommunications protocol.

* * * * *